(12) United States Patent
McDermott et al.

(10) Patent No.: US 6,326,896 B1
(45) Date of Patent: *Dec. 4, 2001

(54) GAUGE MOUNTED PRESSURE MONITOR AND ALARM FOR COMPRESSION MOUNTING WITH COMPRESSED GAS STORAGE TANK

(76) Inventors: Francis Fritz McDermott; Bettie McDermott, both of 11619 Lennox St., Yucaipa, CA (US) 92399

( * ) Notice: Subject to any disclaimer, the term of this patent is extended or adjusted under 35 U.S.C. 154(b) by 0 days.

This patent is subject to a terminal disclaimer.

(21) Appl. No.: 09/696,478

(22) Filed: Oct. 24, 2000

Related U.S. Application Data

(63) Continuation-in-part of application No. 09/398,651, filed on May 24, 1999, now Pat. No. 6,137,417.

(51) Int. Cl.$^7$ .................................................. G08B 21/00
(52) U.S. Cl. ................... 340/626; 340/611; 128/202.22; 128/205.23; 137/557; 33/40.5 R
(58) Field of Search ..................................... 340/626, 611; 128/202.22, 205.23; 137/557; 33/40.5 R

(56) References Cited

U.S. PATENT DOCUMENTS

| | | | |
|---|---|---|---|
| 4,176,617 | * 12/1979 | Pilipski | 116/70 |
| 4,536,756 | * 8/1985 | DePasquale et al. | 340/626 |
| 4,800,373 | * 1/1989 | Mayz | 340/626 |
| 4,990,894 | * 2/1991 | Loescher et al. | 340/573 |
| 5,040,477 | * 8/1991 | Schiffmacher | 116/70 |
| 5,057,822 | * 10/1991 | Hoffman | 340/611 |
| 5,357,242 | * 10/1994 | Morgano et al. | 340/626 |
| 5,542,287 | * 8/1996 | Powers | 73/40.5 R |
| 5,868,162 | * 2/1999 | Dickerson, Jr. | 137/557 |
| 5,893,944 | * 4/1999 | Dong | 96/114 |
| 6,137,417 | * 10/2000 | McDermott | 340/626 |

* cited by examiner

*Primary Examiner*—Edward Lefkowitz
(74) *Attorney, Agent, or Firm*—Donn K. Harms

(57) ABSTRACT

A warning device configured for removable mounting in combination with a high pressure gas cylinder and a regulator used to regulate the high pressure gas supplied by the cylinder. The device compression mounts between the regulator and tank outlet on conventional portable oxygen and gas supply systems using a specially configured manifold. The device features one or a combination of alarms, from a group including audio, visual, electronic, and remotely transmitted alarms. These alarms are activated by a pressure switch monitoring the remaining supply in the gas cylinder through a conduit the manifold. The alarm signal from the device alerts the user, or a third party monitoring the user, of current tank pressure or will sound an alarm when remaining high pressure gas inside the gas cylinder drops below a predetermined level.

9 Claims, 4 Drawing Sheets

GAUGE MOUNTED PRESSURE MONITOR AND ALARM FOR COMPRESSION MOUNTING WITH COMPRESSED GAS STORAGE TANK

This application is a continuation-in-part of U.S. application Ser. No. 09/398,651 filed May 24, 1999 now U.S. Pat. No. 6,137,417.

BACKGROUND OF INVENTION

1. Field of Invention

The present invention relates to pressure sensing equipment for use with cylinders and tanks which hold compressed gas for dispersion under a lower and regulated pressure. More particularly, it relates to a device configured for removable mounting in combination with a portable high pressure gas cylinder and a regulator used to regulate the high pressure gas supplied by the cylinder. Such portable gas tanks or cylinders are commonly used to provide a portable oxygen supply to a user requiring such. The device features one or a combination of alarms, from a group of alarms including audio, visual, electronic, and remotely transmitted alarms. The alarm signal from the device alerts the user, or a third party monitoring the user, when remaining high pressure gas inside the gas cylinder drops below a predetermined level.

2. Prior Art

Cylinders and tanks containing pressurized gasses are used throughout the industrialized world in industry and medicine, the military, aviation, and other instances where a constant supply of regulated gas is required. Such pressurized tanks conventionally are made from high tensile strength material such as steel, aluminum, or resin impregnated fiberglass fibers as they must contain gases inside under extremely high pressures. The gas contained in such cylinders can range from 20 cubic feet to 300 cubic feet or more at pressures as high as 2500 pounds per square inch.

It is desirable to monitor internal tank pressure of the supply cylinder to continually ascertain the remaining usable gas supply in the canister. This is especially true in the case of portable oxygen supply tanks used in medical, aviation, emergency, and other situations as the life of the user may depend upon a constant supply of oxygen for breathing.

Currently, in conventionally used devices, internal tank pressure is monitored by a mechanical gauge, which is attached to a conventional regulator used to reduce incoming high pressure from the tank to useable pressures for the patient to breathe or for industrial uses such as welding. The embodiments of the device disclosed herein are directed at an improved supply tank gas pressure monitoring system using one or a combination of audible alarms, visual alarms, or electronically transmitted, warnings about low pressure and diminishing reserves in the supply tank.

The improved pressure alert system features flashing lights to visually warn of lower than desired pressure. Additionally, an audible buzzer alarm may be employed to alert the user with poor sight or poor attention, to the lowering of pressure below the predetermined level. Further, an optional radio, infrared, or a similar transmitter, can update a central station, computer, or other device configured to receive the digital or analog information regarding remaining pressure which is transmitted by the on board microprocessor communicating through the transmitter.

Conventionally used air tank pressure gauges currently feature a regulator for lowering and regulating internal tank pressure to useable levels combined with a mechanical gauge that displays remaining internal tank pressure. Such regulators need to be quickly connected and disconnected especially when a user is breathing the tank gas, as in the case of a portable oxygen tank used to aid breathing. These supply tanks conventionally feature a compression fitting that seals between the tank outlet aperture and a regulator inlet aperture once compressed in an operative mounting by a compression clamp that is secured around the neck of the tank. A sealed conduit from the tank through the regulator to the user's mask is thereby achieved. The compression clamp used to removably mount the regulator to the tank operates using a handle or other manner of compression to compress the regulator toward the outlet aperture from the tank. A seal is formed between the inlet aperture of the regulator and the outlet aperture of the tank forming a communicating conduit between the two. This mode of attachment provides for easy attachment and detachment of the regulator from the supply tank when a tank change is needed to renew the available gas supply to the user.

This mode of operation, while quick for the user, also has its drawbacks. This is especially true when it comes to communicating remaining tank pressure to the user and to others who would have a prime interest in knowing the remaining tank pressure and thus the remaining volume of compressed gas available for use.

Pressure gauges now conventionally attached to a port in the regulator communicating with the high incoming pressure from the tank, can be hard to read by users with poor eyesight. Such gauges can also be hard to understand for those who are not technically oriented, or do not know what a safe operating pressure actually is for the supply tank or cylinder.

Users in need of oxygen to breathe properly, frequently wear a mask to communicate oxygen from the supply tank to their nose and/or mouth for breathing. Such users may be of ill health from a pulmonary or cardiovascular disease and severely dependent upon a reliable and continued oxygen supply. Other users dependent upon a constant and reliable supply of oxygen include aircraft pilots, fireman and emergency personnel, and military and industrial users. It is therefor imperative that such users comprehend when the remaining tank pressure of the supply tank and volume of gas therein available for breathing, drops below a point deemed prudent. To allow the pressure to dissipate entirely in a medical or emergency situation would risk the user's life support provided by the supply of oxygen. Failure to maintain adequate supplies of oxygen and other gases in industrial and military situations can be costly in time and money from resulting downtime.

The most dependent users of such oxygen supplies are generally health impaired, aged, and/or not technically oriented. The tendencies of such individuals to misinterpret the conventional gauge, or fall asleep while using the oxygen mask, are therefor greatly increased. Other users in emergencies or industrial situations may not be as attentive to the remaining oxygen supply in the tank due to distractions on the job during use of the supply tank. Consequently, a simple and easy to understand system, to warn such users of impending depletion of the gas supply, would be of great benefit. Additional benefit would be derived in situations where third parties who monitor the remaining tank supply of the users. This benefit is provided by the audible, and visual alarms on the device along with the remote monitoring capabilities of the device decreasing the level of attentiveness required to monitor the continuing diminishing air supply in the supply tank. With such a visual, audible, or transmitted alarm, to warn monitoring parties of the dangerous condition that has occurred once tank pressure has dropped below a prudent level, the person monitoring the supply available to the user may be confident that a short lapse of attention in constantly monitoring a mechanical gauge, will no longer cause drastic consequences.

Industrial users of compressed gas would also benefit from such a remote warning device that is easily attachable and detachable to a tank and regulator using conventional mounting brackets and fittings. Welders in need of constant supplies of oxygen, acetylene, and in some cases nitrogen gas supplies, would be better able to concentrate on their work with the knowledge that they will be alerted audibly and visually to tank pressure drops below what is considered operational.

Further, if fitted with a radio, infrared, or other style transmitter, that transmits information concerning remaining tank pressure to a receiving station, supply cylinders that have reached a predetermined level to low to be considered acceptable, would immediately activate a remote alarm or signal. This would allow a central monitoring station in a town or in a hospital or other venue with large numbers of tanks in use, to be immediately informed when a supply tank is reaching critical level. One person could monitor many such supply tanks remotely, and can dispatch someone to replace or recharge tanks that have reached a dangerous or low level.

The device herein disclosed can also be configured whereby the on board transmitter is activated by a remote signal from a central monitoring station, to transmit the remaining tank pressure in the supply tank. In airports, hospitals, and industrial and military uses, a single monitoring station could thus monitor the remaining gas levels in hundreds of supply tanks, thus allowing for better inventory maintenance and replacement of depleted supply tanks.

Prior art has attempted to address some of the aforementioned problems and solutions but without great success.

U.S. Pat. No. 4,175,617 (Pilipski) teaches a low pressure alarm to monitor pressure in containers. However, Pilipski is a complicated array of conduits, offers no manner for easy mounting of the device in a compressed gas circuit for easy removal and remounting, nor does it provide any visual alarm to the hearing impaired or sleeping users.

U.S. Pat. No. 5,040,477 (Shiffmacher) provides for an audible alarm to warn of dwindling air supplies in a portable compressed air tank. However Shiffmacher is designed for threaded engagement with a tank and contains numerous springs and valves that can malfunction. It is thus not easily incorporated for mounting and dismounting with the millions of conventional compression clamp style devices currently in use. Further, it offers no visual alarm nor remote signaling options.

U.S. Pat. No. 5,057,822 (Hoffman) addresses the issue of a warning of low pressure in a pressurized gas system servicing a plurality of patients in a hospital or other setting. Hoffman however is designed for permanent mounting in the system and is not easily mounted and dismounted on the millions of portable units using a compression clamp style fitting to access the internal air supply through a regulator.

As such, there exists a need for an easily and inexpensively manufactured multi functional warning system which is easily mounted and dismounted from the millions of conventionally used pressurized tanks which employ a compression clamp mount of the regulator to the tank. Such a device should offer a plurality of alarm modes such that those with poor eyesight could be warned of a problem with a bright blinking light. Such a device should also offer an audible alarm to awaken sleeping or inattentive users to the impending pressure drop below functional norms. Such a device should also be capable of optionally transmitting actual pressure when queried from a remote location or automatically if tank pressure drops below norms.

SUMMARY OF THE INVENTION

Applicants' device is an easily manufactured and utilized apparatus, which provides users of compressed air tanks, a warning of any impending or actual drop of internal tank pressure below a predetermined level. The device is especially useful for those who are inattentive, visually or technically impaired as it initiates an alarm once tank pressure communicated to the device reaches a predetermined level.

The device features a manifold that is capable of operative engagement with millions of conventional pressurized tanks which use a compression clamp to removably mount a regulator in operative engagement with a tank of pressurized gas. The manifold is configured to allow of inclusion into this operatively connected tank and regulator mating without any modification to either the tank, the clamp, or the regulator. Consequently, it would be immediately available to millions of users worldwide.

The manifold features a tank aperture that mates with the tank outlet aperture. The tank aperture communicates through the manifold to the other side which is configured to operatively engage a conventional regulator. The tank, the regulator, and the manifold, can thereafter be operatively engaged in a sealed relationship by the attachment of a conventional compression clamp thereto in the conventional fashion.

A conduit communicates through the body of the manifold from the tank aperture to a chamber at the end distal to the engagement with the tank. The chamber is configured for an operative sealed engagement with a conventional electronic pressure gauge that monitors tank pressure communicated thereto through the conduit in the body communicating with the supply tank.

The pressure switch is a conventional electronic pressure gauge that features a pressure switch which mechanically or electronically completes an electrical circuit once pressure is read at a predetermined level. Such devices conventionally use an electronic pressure sensitive plate or a translating member that activates a variable current from a battery through the device to a receiver in the electronic gauge. A digital display in the pressure switch may optionally be provided which will continually indicate in numerals on an electronic display, the remaining supply tank pressure. Once a predetermined pressure level is communicated to the pressure switch from the tank, a mechanical or electronic switch activates and completes the circuit from the battery that operates one or a combination of a group of devices consisting of a visual alarm, an audible alarm, or a transmitter which communicates the alarm to a remote monitoring site.

The unique design of the disclosed device also provides for the easy inclusion immediately into millions of conventional tank and regulator combination devices attached together by a compression clamp. The device can thus be immediately used to provide real time audio and visual warnings of diminishing oxygen supply to persons dependent on tank supplied oxygen. It can also be used to improve industry efficiency with the provision of better inventory control using the advance warnings of low gas supplies provided by the device.

An object of this invention is to provide a warning device for low pressure in a compressed gas cylinder that is easily mounted to conventional mounting clamp style systems without modification to existing tank and regulator components.

Another object of this invention is to provide additional safety to the user, and an alert to third parties who might be monitoring the user, through the provision of an audible alarm that will alert the inattentive to the lowered tank pressure.

A further object of this invention is the provision of a highly visible alarm to alert users and third parties of a tank pressure drop below norms.

An additional object of the invention is to provide for remote monitoring of supply tank pressure remaining in real time, either automatically or when queried from the remote monitoring site.

Further objects of the invention will be brought out in the following part of the specification, wherein the detailed description is for the purpose of fully disclosing the invention without placing limitations thereon.

BRIEF DESCRIPTION OF DRAWING FIGURES

DETAILED DESCRIPTION OF THE PREFERRED EMBODIMENTS OF THE INVENTION

Figure 1:
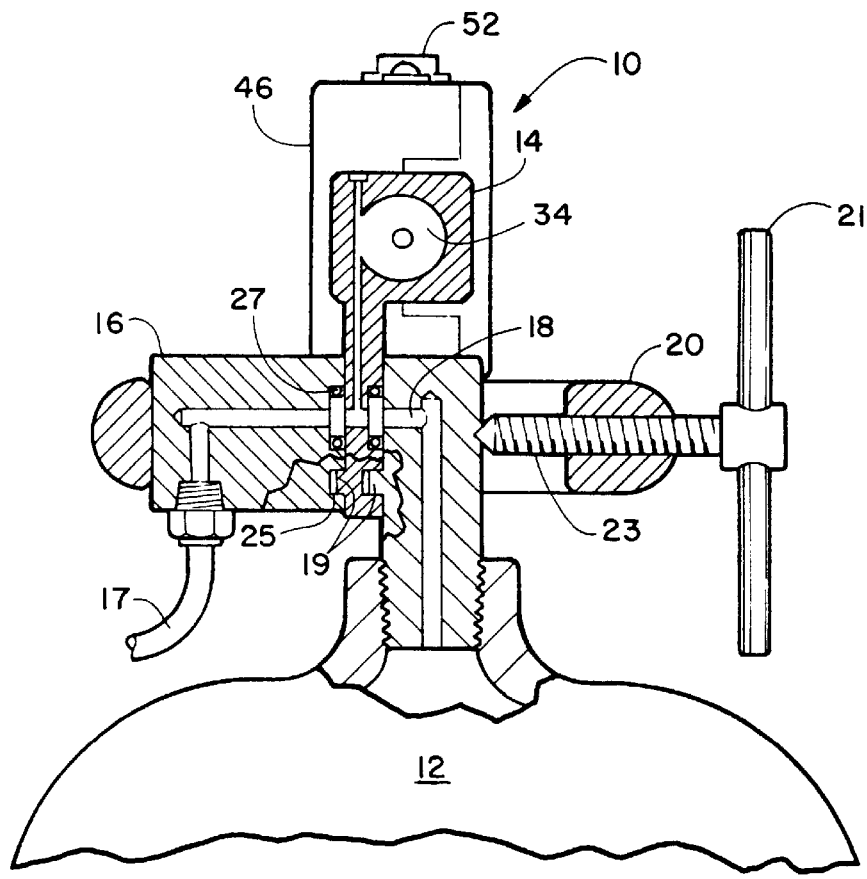
FIG. 1 is a side view of the compression mounted warning device herein disclosed, in operative engagement with a conventional pressurized gas tank.
Figure 2:
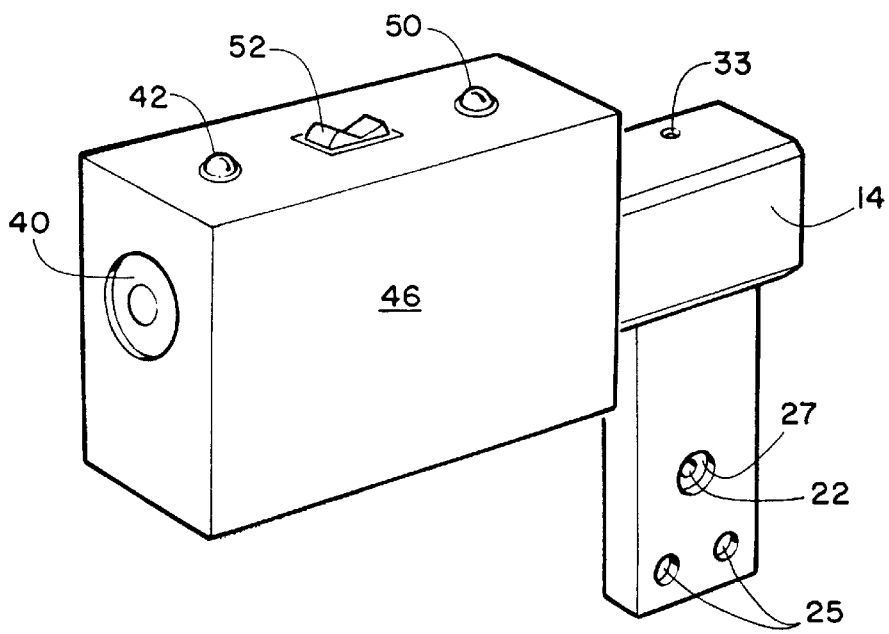
FIG. 2 is a perspective view of the compression mounted warning device showing the manifold mounted to the alarm.
Figure 3:
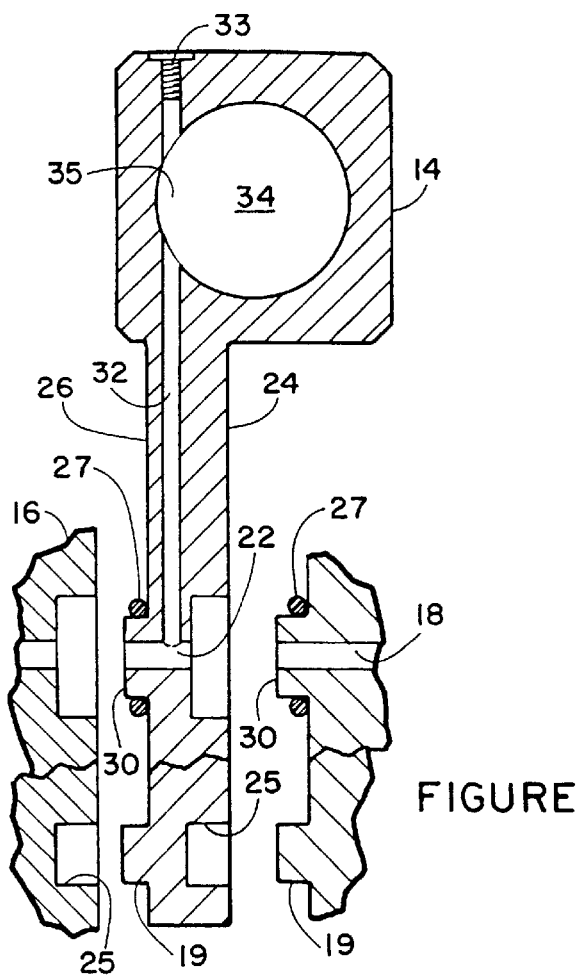
FIG. 3 is side cut away view of the manifold showing the conduits for communicating high pressure from the tank.
Figure 4:
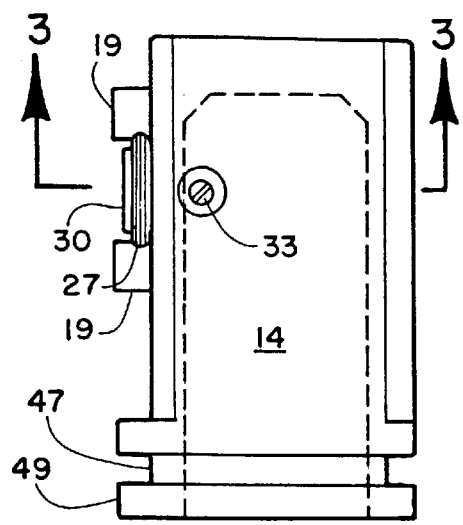
FIG. 4 is a top view of the manifold showing the regulator engagement and the groove mount for the alarm case.

Referring now to the drawing FIGS. 1–7, specifically FIG. 1 depicts a side view of the compression mounted warning device 10 herein disclosed in operative engagement with a conventional pressurized gas tank 12.

The device 10 features a manifold 14 that is capable of operative engagement with the regulator 16 and the orifice at tank outlet orifice 18. A conventionally used compression clamp 20 is used to operatively engage the device 10 and the regulator 16 with gas outlet 17 and the tank outlet orifice 18 in an operative engagement while still providing for a removable mount of the devices, to the tank outlet orifice 18 by removal of the compression clamp 20. The device 10 is configured to allow for inclusion into this operatively connected tank outlet orifice 18 and regulator 16 mating, without any modification to either the tank outlet orifice 18, the clamp 20, or the regulator 16. Extra clearance for the clamp 20 may be optionally provided by slots 21 in the manifold exterior if needed. Consequently, the device 10 is easily mounted to millions of such devices currently in use without modification thereto using the conventional clamp 20 tightened thereon in the conventional fashion using handle 21 to increase or decrease pressure from compression screw 23 on the regulator 16 and tank 12. The device 10 being configured for operational and sealed engagement by a compression fit between the regulator 16 and tank 12, is easily attached to conventional portable oxygen supply tanks and devices featuring a similar compression mounting scheme for the regulator 16 to the tank 12.

The manifold 14 features a tank aperture 22 that mates with the tank outlet orifice 18 used on conventional compressed gas tanks 12. Registration pins 19 are situated on the device 10 and adjacent to the tank outlet orifice 18 to cooperatively engage pin apertures 25 on the device 10 and the regulator 16 to maintain registration of the device 10 the regulator 16 and the tank 12 when connected to each other. The tank aperture 22 communicates through the manifold 14 to the first side 24 to a second side 26. The first side 24 of the manifold 14 is configured with a tank mount 28 to operatively engage the tank outlet orifice 18 in a sealed relationship when compressed thereon. The second side 26 of the manifold 14 is configured with a regulator mount 30 to operatively engage a conventional regulator 16 in a sealed relationship when in an operational compression mounting therewith. The outlet orifice 18 of the tank 12, the regulator 16, and the manifold 14, can thereby be operatively engaged, in a sealed relationship, to allow communication of compressed gas from the tank interior, through the tank aperture 22 communicating through the manifold 14 to the regulator 16, by the attachment of a conventional compression clamp 20 thereto in the conventional fashion and using conventional rubber or silicone seals 27 where needed. The regulator 16 thus mounts and operates in a normal fashion, without modifications, when used in combination with the device 10 and the tank 12.

A conduit 32 communicates through interior of the manifold 14. The conduit 32 is drilled through the top of the manifold 14 traveling axially therethrough, and is sealed in a conventional fashion using screw 33. The conduit 32 thereby communicates gas pressure from the tank aperture 22 and communicating tank 12 to a tank pressure sensing chamber 34 at an intersection 35 conduit 32 and sensing chamber 34 at the end of the manifold 14 distal to the engagement with the tank 12 and regulator 16. The tank pressure sensing chamber 34 is configured for an operative sealed communication with a conventional electronic pressure switch 36, which monitors tank pressure communicated thereto through the conduit 32 in the manifold 14, when the device 10 is operatively engaged with the tank 12. On such tanks 12 there is conventionally mounted a valve that will interrupt the communication of gas to the tank outlet orifice 18 when closed. This valve must be open to allow communication of gas from the tank 12 through the manifold 14 to the regulator 16. When the tank valve is thus open, the tank pressure sensing chamber 34 communicates with the conduit formed between the tank 12 and regulator 16 thereby allowing a gauging of communicated tank pressure by the pressure switch 36.

The pressure switch 36 may be a conventional electronic pressure activated switch that causes the activation of a switching means such as an electronic switch 37 and completes an electrical circuit running from an electric power source such as a battery 38 using contacts in the conventional mounting and wiring fashion for such devices. When pressure communicated from the supply tank 12 drops below a certain preset pressure level, an electronic pressure plate 39 communicates to the processor 45 which senses this drop, and completes the electrical circuit by activating the electronic switch 37 which provides power to an alarm means. Generally a microprocessing device mounted in the pressure switch 37 receives the data from the pressure plate 39 and determines when to activate the communicating electronic switch 37. This embodiment is also capable of communicating current tank pressure on a continual basis.

The pressure switch 36 may also be a conventional mechanical style switch 53 which typically uses adjustable biasing means such as springs 55 to bias a translating member 57 to keep attached electrical contacts 59 out of contact with stationary contacts 61. They remain out of contact until a certain predetermined pressure in the tank 12 drops below a level whereby the translating member 57 laterally translates to allow contact and complete the circuit.

Other types of pressures sensitive switch devices are also commercially available including variations of the aforementioned electronic and mechanical devices herein described. Use of such other switch devices is anticipated depending on the application for which the device 10 is intended, so long as the pressure switch 36, once a predetermined pressure level is communicated hereto from the tank 12, communicates that data and causes an alarm means to activate.

The alarm means, in the best mode of the device 10 herein disclosed, features one or a combination of devices from group of devices including an audible buzzer 40, a visual warning light 42, or a transmitter 44 configured to transmit tank pressure information to a remote receiver configured to receive and process such information. In the case of transmitter 44 a microprocessor 45 and on board memory may be necessary to configure the pressure information electronically and transfer it to the remote receiver on demand or when the pre determined low pressure threshold is reached. Currently that threshold is approximately 500 psi but this can be adjusted for the application.

The pressure switch 36 in the current best mode is threadably engaged with the sensing chamber 34 to achieve a sealed engagement therewith and to allow for testing and calibrations prior to the attachment of the cover 46 to the manifold 14. Calibration and delayed attachment of the cover 46 would be provided by the cover 46 in the current best mode being configured to slidably engage a cover mount 47 formed by two ribs 49 about the exterior of the manifold 14 thereby allowing the cover 46 to be slidably mounted upon the manifold 14 after the pressure switch 36 is mounted to the manifold 14. The pressure switch 36 could also be press fit, or compression mounted to the manifold 14 as could the cover 46 be mounted in different fashions with screws or bands and those skilled in the art will recognize such other means of attachment of the pressure switch 36 in an operative sealed communication with the sensing chamber 34 in the manifold 14, and the cover 46 to the manifold 14, and such are anticipated.

Connection of the electrical power supply from the battery 38, to one or combination of warning means devices such as the audible buzzer 40 and/or the warning light 42 and/or the transmitter 44, would be handled in the conventional fashion, using wiring 48, which is loose or on printed circuit boards or combinations thereof.

The warning light 42 works best using a light emitting diode (LED) due to the low current draw of such devices allowing for longer battery life. Also, an LED would be the best mode to provide a power light 50 could be included in the device 10 to show that the device 10 is activated. Activation and deactivation of the device 10 is accomplished using the conventional switching means such as an on/off switch 52. When activated, the on/off switch 52 would allow current from the battery 38 to reach the warning means devices through the pressure switch 36 when the pressure switch 36 allows such communication therethrough. The power light 50 would of course, will always be illuminated when the switch 52 is in the on position.

The transmitter 44 would be of conventional design and would also have internal circuitry, memory, and microprocessors sufficient to receive and interpret data communicated from the pressure switch 36 and thereon transmit the data to a remote receiver. A broadcasting means 54 such as an antenna for radio waves or an infrared transmitter, which broadcasts data using inferred light, would be provided and attached to the transmitter 44 in a conventional fashion, to broadcast transmissions of data from the transmitter 44 to a remote receiver configured to receive the transmissions. This transmission optionally may be accomplished using polling, wherein the remote receiver polls the transmitter 44 which responds with current data regarding the tank pressure and usage. If the pressure switch 36 used is capable of variable pressure readings, then current pressure can also be transmitted instead of just a warning when pressure drops below a predetermined level.

Alternatively, the device 10, using this pressure switch with variable pressure reading output, can be set to automatically transmit to the remote receiver, current information concerning current remaining tank pressure and/or usage of the air supply in the tank 12. Or, the device 10 could be configured to have the transmitter 44 relay tank pressure data for one or combinations of purposes to fit the circumstances in which the device 10 is to operate, including reporting at predetermined time spans, reporting when polled by a remote receiver to respond, reporting when a threshold low pressure is reached, or reporting when current usage of the air supply from the tank 12, indicates a lack of the anticipated consumption by the user.

In this fashion, the supply of gas in a large number of tanks such as a hospital, or airport, even in a large geographical area such as a city, could be monitored from a remote location by a single person. The monitoring person or even a computer set to respond to various data stimuli, would then dispatch new supply tanks to prior to their anticipated need by users. Further, individuals using oxygen such as the elderly or firemen, could be immediately checked upon for well being should data transmitted from the device 10 indicate a lack of use or lower than anticipated use by those individuals. Such a lack of anticipated consumption would occur if for some reason a fireman could not get to his air mask, or an elderly person had trouble hooking the device on their face or if they fell out of reach of the device 10 and could not get back up. Valuable time would thereby be saved by the dispatch of help to the person in need.

Figure 8:
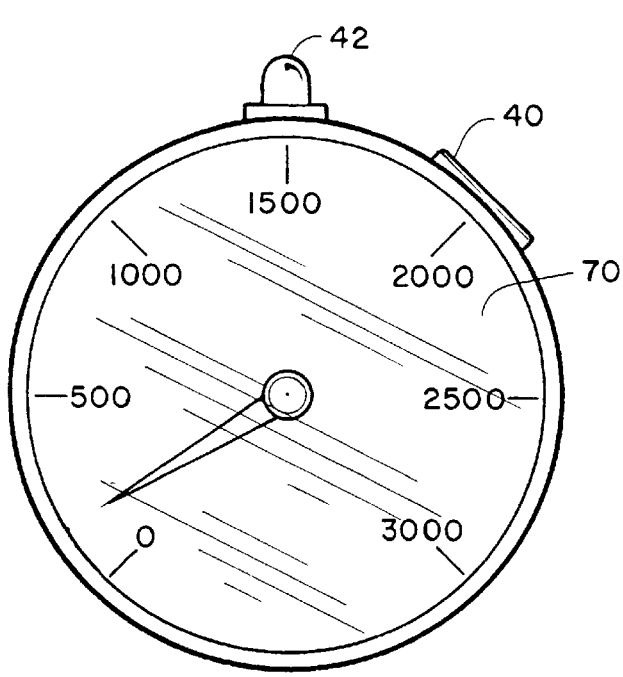
FIG. 8 depicts a front view of the disclosed gauge mounted embodiment of the warning device herein disclosed.
Figure 9:
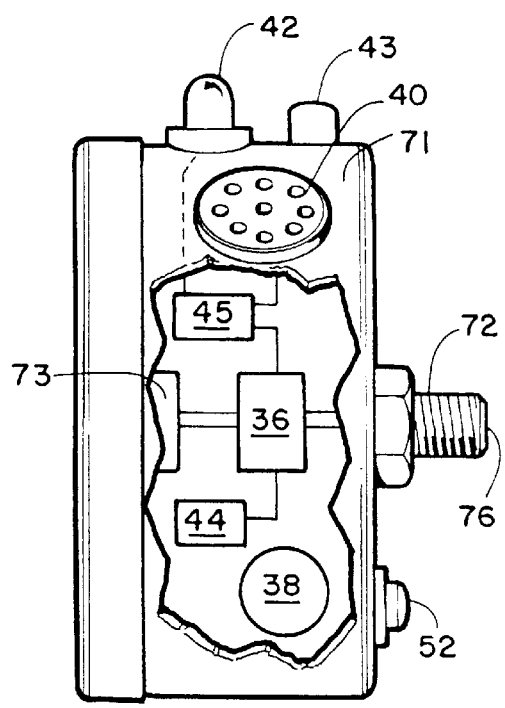
FIG. 9 is a side cut away view of FIG. 8.

FIGS. 8 and 9 depict an alternate configuration of the device wherein the components are contained inside a conventional analog or digital pressure gauge. In this embodiment, a threaded fitting 72 is configured to cooperatively engage threads 74 about the sensing chamber 34 in a sealed relationship. The threaded fitting 72 has an axial conduit 76 communicating therethrough whereby the pressure in the sensing chamber 34 is communicated to the pressure switch 36 which is situated inside the gauge body 70. The pressure switch 36 is in communication with the other components much like the configuration of FIG. 5. In this fashion, the pressure switch 36 senses the gas pressure communicated from the tank 12 to the sensing chamber 34 through the axial conduit 76. The pressure switch 36 thereby communicates with the appropriate aforementioned pressure information to the component of choice.

Figure 5:
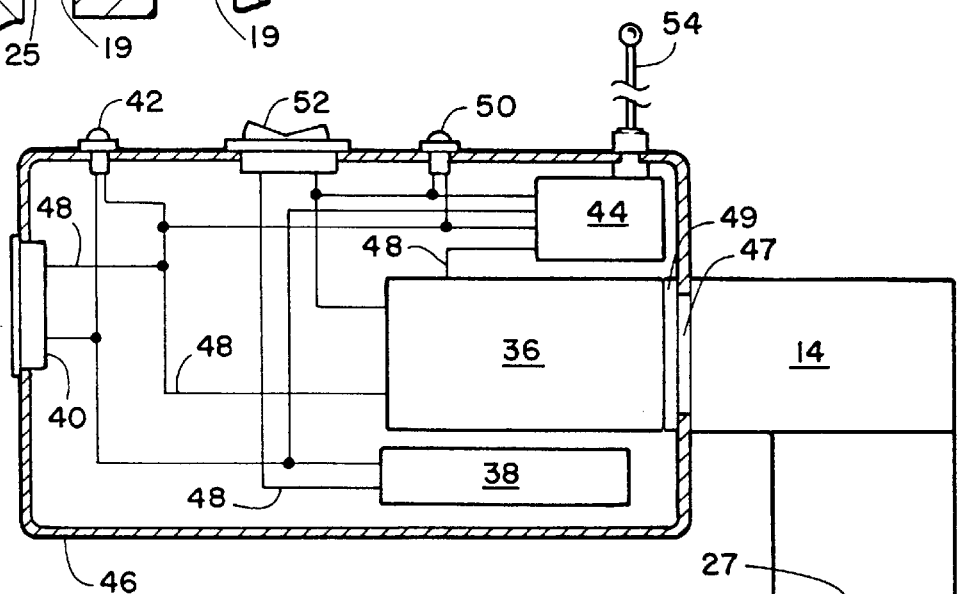
FIG. 5 is a cut away side view of the alarm casing showing the internal components.
Figure 6:
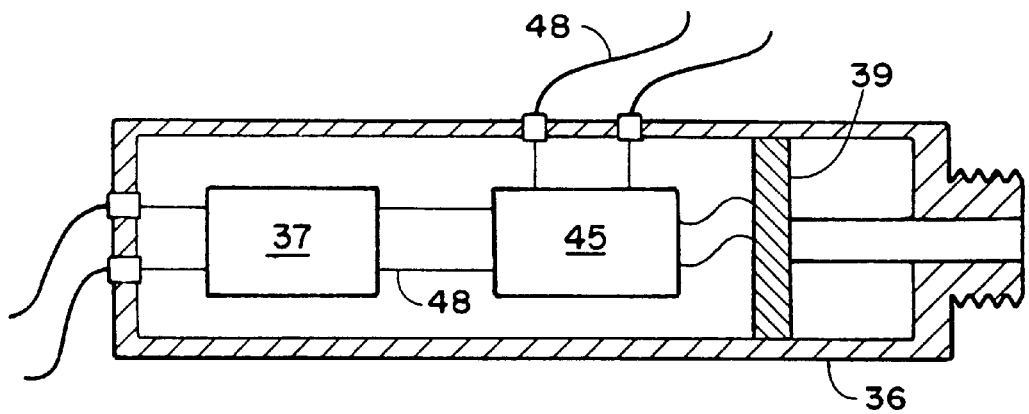
FIG. 6 depicts a typical electronic pressure sensing device.
Figure 7:
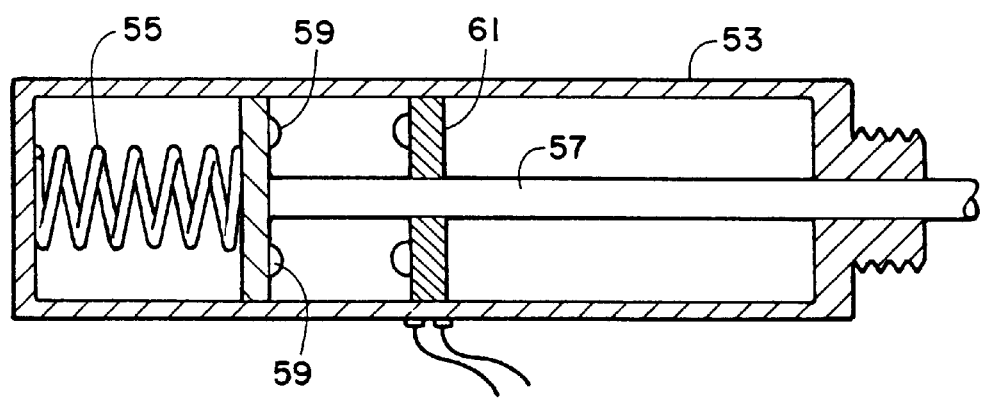
FIG. 7 depicts a typical mechanical pressure sensing device.
Figure 10:
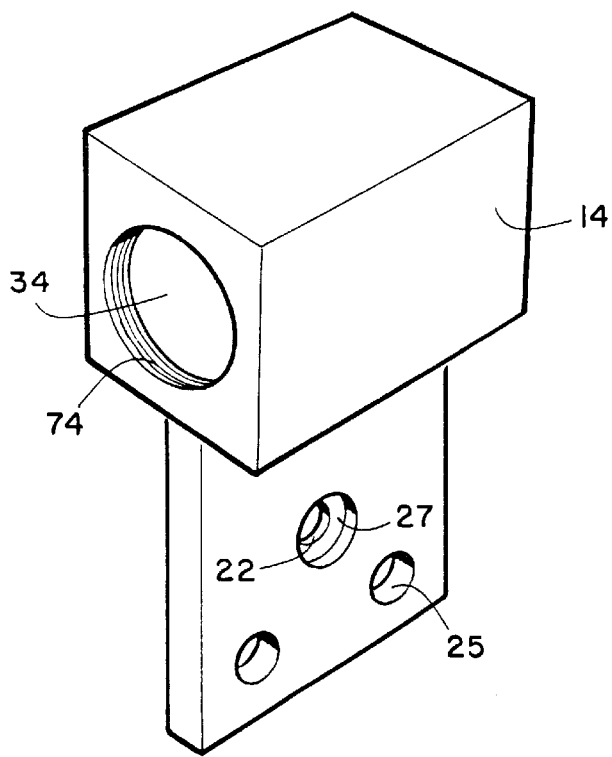
FIG. 10 depicts a perspective view of a compression mounted mainfold.

In the current best mode the pressure switch 34 would be engaged with and communicate with the sensing chamber 34 in the aforementioned sealed relationship. In some cases where the manifold 14 is not available it may be possible to engage the treads with a fitting between the regulator and the tank 16 so that the axial conduit 76 communicates with unregulated tank pressure, however the current best mode would feature the manifold 14. Once the pressure switch 34 is in communication with pressure inside the tank 12, and calibrated it would be wired to communicate and activate the audible buzzer 40, and/or the warning light 42 and/or the transmitter 44, and/or a digital gauge (not shown) or the other components in the aforementioned fashion and as shown in FIGS. 5–7. Should the the gauge 70 be digital it would also be wired in the conventional fashion to the pressure switch 36 or the processor 45 which would also be contained inside the body of the gauge 70. Should the gauge 70 be analog and pressure driven, communication with a sealed engagement with the axial conduit 76 would be provided to drive gauge drive 73 directly with tank pressure in the conventional fashion. As shown in FIG. 10 the manifold 14 would feature threads 74 to cooperatively engage the threaded fitting 72 to provide a sealed engagement with the axial conduit.

While all of the fundamental characteristics and features of the pressure monitor and alarm for compression mounting with a compressed gas storage tank have been shown and described, it should be understood that various substitutions, modifications, and variations may be made by those skilled in the art without departing from the spirit or scope of the invention. consequently, all such modifications and variations are included within the scope of the invention as defined by the following claims.

What is claimed is:

1. A pressure monitoring device for attachment to conventional compression sealed tank and regulator systems comprising:

an elongated manifold, said manifold having a first side and a second side, a mounting end, and a second end distal to said mounting end; an orifice communicating through said manifold at said mounting end from said first side to said second side;

a chamber formed inside said second end of said elongated manifold, said chamber having a mounting aperture communicating between said chamber and the exterior of said elongated manifold;

a conduit, said conduit axially communicating though said manifold, said conduit providing communication between said chamber and said orifice;

an electrical power means;

an alarm means, said alarm means activated when electrical power from said power means is communicated thereto;

a pressure sensing means communicating with said chamber in a sealed engagement with said mounting aperture, said pressure sensing means communicating information concerning pressure level in said chamber to a switching means communicating with said pressure sensing means;

said switching means communicating electrical power from said electrical power means to said alarm means when a predetermined pressure level is reached in said chamber and communicated to said switching means from said pressure sensing means;

a pressure gauge, said pressure gauge having a body portion and a gauge face, said pressure gauge providing a gauge reading of pressure in said chamber;

said switching means, said pressure sensing means, said electrical power means, and said alarm means all being mounted to said body portion of said pressure gauge;

said orifice configured at said first side and said second side for an operative connection in a compression mounting between an outlet of a tank of compressed gas, and an inlet of a regulator, and providing communication therebetween; and whereby a sealed communication through said orifice between said outlet of said tank and said chamber and said inlet of said regulator may be achieved when said mounting end is operatively compression mounted in combination with said regulator and said tank.

2. The device as claimed in claim 1 additionally comprising an activation switch said activation switch having an off position wherein electrical power from said electrical power means is disconnected from said switching means and an on position wherein power from said electrical power means is communicated to said switching means.

3. The device in claim 2 additionally comprising a first light means which is illuminated when said activation switch is in said on position.

4. The device in claim 1 wherein said alarm means comprises one or a combination of alarms from a group consisting of and audible alarm, a visual alarm, or a transmitter for broadcasting an alarm to a remote location.

5. The device in claim 4 wherein said audible alarm is a buzzer.

6. The device in claim 4 wherein said visual alarm is a light emitting diode.

7. The device in claim 1 wherein said pressure gauge is digital.

8. The device in claim 1 wherein said pressure gauge is electrically activated by communication from said pressure sensing means.

9. The device in claim 1 wherein said pressure gauge is mechanically activated by pressure communicated thereto through an axial conduit from said chamber.

* * * * *